(12) United States Patent
Blandford et al.

(10) Patent No.: US 10,901,875 B2
(45) Date of Patent: Jan. 26, 2021

(54) EVALUATING AND PRESENTING SOFTWARE TESTING PROJECT STATUS INDICATORS

(71) Applicant: Teachers Insurance and Annuity Association of America, New York, NY (US)

(72) Inventors: Scott Matthew Blandford, Princeton, NJ (US); James Paul Gouin, Charlotte, NC (US); Andrea Joan Gonsalves, Stow, MA (US); Steven Antony Schweiger, Charlotte, NC (US); Sampada Sanjay Salunkhe, Acton, MA (US); Donald Robert Buckshi, Sherrills Ford, NC (US); Paul Jeffrey Russell, Greensboro, NC (US); Brian David Lomax, Marlborough, MA (US); David Robert White, Rosh HaAyin (IL); Ido Dangur, Kibbutz Regavim (IL)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 3 days.

(21) Appl. No.: 16/551,062

(22) Filed: Aug. 26, 2019

(65) Prior Publication Data
US 2019/0377665 A1 Dec. 12, 2019

Related U.S. Application Data

(62) Division of application No. 14/662,518, filed on Mar. 19, 2015, now Pat. No. 10,437,707.

(51) Int. Cl.
G06F 9/44 (2018.01)
G06F 11/36 (2006.01)
G06Q 10/06 (2012.01)

(52) U.S. Cl.
CPC ..... *G06F 11/3664* (2013.01); *G06Q 10/0639* (2013.01)

(58) Field of Classification Search
None
See application file for complete search history.

(56) References Cited

U.S. PATENT DOCUMENTS 5,696,701 A 12/1997 Burgess
5,758,061 A * 5/1998 Plum .................. G06F 11/3676
714/35

(Continued)

OTHER PUBLICATIONS

USPTO, Office Action for U.S. Appl. No. 14/662,518, dated Jul. 25, 2017.

(Continued)

*Primary Examiner* — Insun Kang
(74) *Attorney, Agent, or Firm* — Lowenstein Sandler LLP (57) ABSTRACT

Systems and methods for evaluating and presenting software testing project status indicators. An example method may comprise: determining, by a computer system, a plurality of project status indicators comprising one or more average test execution rates, a required test execution rate, a test execution schedule variance, an actual test completion ratio, and/or a test completion schedule variance; and causing one or more project status indicators to be displayed in a visual relation to each other, to a timeline, and/or to another project's status indicators.

18 Claims, 8 Drawing Sheets

(56) References Cited

U.S. PATENT DOCUMENTS

| | | | |
|---|---|---|---|
| 6,477,471 B1* | 11/2002 | Hedstrom | G06F 11/3616 702/34 |
| 6,536,036 B1 | 3/2003 | Pavela | |
| 6,546,506 B1* | 4/2003 | Lewis | G06Q 10/06 714/38.1 |
| 7,873,944 B2 | 1/2011 | Bangel et al. | |
| 7,921,026 B2 | 4/2011 | OCull et al. | |
| 8,146,100 B2 | 3/2012 | Killian-Kehr | |
| 8,589,203 B1 | 11/2013 | Collins et al. | |
| 8,612,572 B2 | 12/2013 | Hayes | |
| 8,875,088 B1 | 10/2014 | Holler et al. | |
| 8,881,095 B1* | 11/2014 | Hunt, Jr. | G06F 11/3688 705/7.13 |
| 9,110,496 B1 | 8/2015 | Michelsen | |
| 9,201,768 B1* | 12/2015 | Alon | G06F 11/3672 |
| 2002/0019945 A1 | 2/2002 | Houston et al. | |
| 2003/0137541 A1 | 7/2003 | Massengale et al. | |
| 2003/0229618 A1 | 12/2003 | Judy | |
| 2004/0114518 A1 | 6/2004 | MacFaden et al. | |
| 2004/0205727 A1* | 10/2004 | Sit | G06F 11/3664 717/125 |
| 2005/0039163 A1 | 2/2005 | Barrett et al. | |
| 2005/0071807 A1* | 3/2005 | Yanavi | G06F 11/008 717/104 |
| 2005/0114830 A1 | 5/2005 | Knutson et al. | |
| 2005/0216796 A1* | 9/2005 | Carlos | G06F 11/008 714/699 |
| 2005/0240903 A1* | 10/2005 | Lake | G06Q 10/04 717/124 |
| 2005/0278208 A1 | 12/2005 | Schultz | |
| 2006/0101378 A1 | 5/2006 | Kennedy et al. | |
| 2006/0147024 A1 | 7/2006 | Dezonno et al. | |
| 2006/0224740 A1 | 10/2006 | Sievers-Tostes et al. | |
| 2007/0118491 A1 | 5/2007 | Baum et al. | |
| 2007/0203775 A1 | 8/2007 | Busch et al. | |
| 2007/0226546 A1* | 9/2007 | Asthana | G06F 11/008 714/47.1 |
| 2007/0226755 A1 | 9/2007 | Kilian-Kehr | |
| 2007/0233534 A1 | 10/2007 | Martin et al. | |
| 2008/0010543 A1 | 1/2008 | Yamamoto et al. | |
| 2008/0016490 A1 | 1/2008 | Pabalate et al. | |
| 2008/0082388 A1 | 4/2008 | Fishman | |
| 2008/0082956 A1 | 4/2008 | Gura et al. | |
| 2008/0082957 A1* | 4/2008 | Pietschker | G06Q 10/10 717/101 |
| 2008/0092120 A1 | 4/2008 | Udupa et al. | |
| 2008/0221946 A1 | 9/2008 | Balon | |
| 2008/0270469 A1 | 10/2008 | Myerson et al. | |
| 2008/0282235 A1 | 11/2008 | Jadhav et al. | |
| 2009/0171893 A1 | 7/2009 | Gonzales et al. | |
| 2009/0299940 A1 | 12/2009 | Hayes et al. | |
| 2010/0017246 A1 | 1/2010 | Farrell et al. | |
| 2010/0017738 A1 | 1/2010 | Rhodes et al. | |
| 2010/0100871 A1* | 4/2010 | Celeskey | G06F 11/008 717/124 |
| 2010/0199258 A1* | 8/2010 | Lindley | G06Q 10/06 717/105 |
| 2011/0041120 A1* | 2/2011 | Nagappan | G06F 8/77 717/126 |
| 2011/0066557 A1* | 3/2011 | Bassin | G06F 11/3616 705/301 |
| 2011/0066887 A1* | 3/2011 | Bassin | G06F 11/3672 714/27 |
| 2011/0066890 A1* | 3/2011 | Bassin | G06F 11/3672 714/37 |
| 2011/0066893 A1* | 3/2011 | Bassin | G06F 8/20 714/38.1 |
| 2011/0093833 A1 | 4/2011 | Kierans et al. | |
| 2011/0296371 A1* | 12/2011 | Marella | G06F 11/3688 717/101 |
| 2012/0110551 A1 | 5/2012 | Fink et al. | |
| 2012/0179508 A1 | 7/2012 | Sefland | |
| 2012/0253876 A1 | 10/2012 | Hersch | |
| 2012/0317541 A1 | 12/2012 | Kaulgud et al. | |
| 2013/0061202 A1* | 3/2013 | Nema | G06Q 10/06395 717/101 |
| 2013/0152046 A1 | 6/2013 | Salecker et al. | |
| 2013/0152047 A1 | 6/2013 | Moorthi et al. | |
| 2013/0246113 A1 | 9/2013 | Mantravadi et al. | |
| 2013/0290073 A1* | 10/2013 | Bassin | G06Q 10/00 705/7.37 |
| 2013/0311968 A1* | 11/2013 | Sharma | G06Q 10/06 717/101 |
| 2014/0236660 A1 | 8/2014 | Cantor et al. | |
| 2014/0317591 A1* | 10/2014 | Rosomoff | G06F 8/70 717/101 |
| 2014/0344775 A1 | 11/2014 | Dunne et al. | |
| 2014/0344776 A1* | 11/2014 | Dunne | G06Q 10/06 717/101 |
| 2015/0012852 A1 | 1/2015 | Borodin et al. | |
| 2015/0058675 A1 | 2/2015 | Kadishay | |
| 2015/0143327 A1 | 5/2015 | Holmes et al. | |
| 2015/0220329 A1* | 8/2015 | Bassin | G06F 8/20 717/102 |
| 2015/0278751 A1 | 10/2015 | Sunder et al. | |
| 2015/0286470 A1 | 10/2015 | Dahan | |
| 2015/0301804 A1* | 10/2015 | Dunne | G06Q 10/06 717/101 |
| 2015/0363292 A1* | 12/2015 | Shiraishi | G06F 11/3604 717/125 |
| 2015/0378874 A1* | 12/2015 | Prasad | G06F 11/3692 717/124 |
| 2016/0055079 A1 | 2/2016 | Hanna | |
| 2016/0086124 A1* | 3/2016 | Thippavajjula | G06F 8/10 717/102 |
| 2016/0132425 A1* | 5/2016 | Bassin | G06Q 10/00 717/101 |
| 2016/0232467 A1* | 8/2016 | Natarajan | G06Q 10/0635 |
| 2017/0052831 A1 | 2/2017 | Wu et al. | |
| 2017/0052880 A1* | 2/2017 | Rosomoff | G06F 8/70 |
| 2017/0139817 A1* | 5/2017 | Bassin | G06Q 10/06 |
| 2017/0220338 A1* | 8/2017 | Novak | G06F 8/71 |
| 2018/0004488 A1* | 1/2018 | Dunne | G06Q 10/06 |
| 2018/0165178 A1* | 6/2018 | Rosomoff | G06F 8/70 |
| 2018/0196731 A1* | 7/2018 | Moorthi | G06F 11/368 |
| 2019/0087393 A1* | 3/2019 | Myers | G06F 17/2235 |

OTHER PUBLICATIONS

USPTO, Final Office Action for U.S. Appl. No. 14/662,518, dated Jan. 17, 2018.
USPTO, Office Action for U.S. Appl. No. 14/662,518, dated Apr. 4, 2018.
USPTO, Final Office Action for U.S. Appl. No. 14/662,518, dated Oct. 18, 2018.
USPTO, Office Action for U.S. Appl. No. 14/662,518, dated Feb. 7, 2019.
USPTO, Advisory Action for U.S. Appl. No. 14/662,518, dated Mar. 27, 2018.
USPTO, Advisory Action for U.S. Appl. No. 14/662,518, dated Dec. 21, 2018.
USPTO, Notice of Allowance for U.S. Appl. No. 14/662,518, dated May 30, 2019.
USPTO, Office Action for U.S. Appl. No. 14/951,072, dated Jun. 14, 2017.
USPTO, Final Office Action for U.S. Appl. No. 14/951,072, dated Oct. 10, 2017.
USPTO, Office Action for U.S. Appl. No. 14/951,072, dated Feb. 15, 2018.
USPTO, Advisory Action for U.S. Appl. No. 14/951,072, dated Dec. 18, 2017.
USPTO, Notice of Allowance for U.S. Appl. No. 14/951,072, dated Sep. 7, 2018.
Kou, H., Automated Inference of Software Development Behaviors: Design, Implementation and Validation of Zarro for Test-Driven Development, Dissertation, 2007, 207 pages, [retrieved on Oct. 3, 2017], Retrieved from the Internet: <URL:https://www.researchgate.net/publication/250270950 >.

(56) References Cited

OTHER PUBLICATIONS

Kuona—Build Analytics, Nov. 22, 2015, 5 pages, [retrieved on Oct. 3, 2017], Retrieved from the Internet: <URL:https://web.archive.org/web/20151122025033/https://kuona.github.io/>.

Cook, J. E., et al., Automating Process Discovery through Event-Data Analysis, Proceedings of the 17th international conference on Software engineering, 1995, pp. 73-82, [retrieved on Oct. 3, 2017], Retrieved from the Internet: <URL: http://dl.acrn.org/>.

Johnson, P. M., et al., Automated Recognition of Test-Driven Development with Zorro, Agile Conference (AGILE), 2007, 10 pages, [retrieved on Jun. 8, 2017], Retrieved from the Internet: <URL:http://ieeexplore.ieee.org/>.

Getting Started with Automated Build Studio 4, AutomatedQA Corporation, 2007, 192 pages, [retrieved on Jun. 8, 2017], Retrieved from the Internet: <URL:https://moonsoft.fi/materials/automatedqa_abs_getting_started_pdf>.

USPTO, Office Action for U.S. Appl. No. 16/216,562, dated Jul. 25, 2019.

\* cited by examiner

| Actual test exec. rate | Defect detected rate | Actual test exec. rate | Defect detected rate | Actual test exec. rate | Defect detected rate | Actual test exec. rate | Defect detected rate | Actual test exec. rate | Defect detected rate |
|---|---|---|---|---|---|---|---|---|---|
| 1 | 0.5 | 21 | 21.6 | 41 | 59.5 | 61 | 81.6 | 81 | 92.4 |
| 2 | 1 | 22 | 23.7 | 42 | 60.3 | 62 | 82.2 | 82 | 92.6 |
| 3 | 1.5 | 23 | 25.5 | 43 | 62.2 | 63 | 82.8 | 83 | 93 |
| 4 | 2 | 24 | 27.3 | 44 | 64 | 64 | 83.4 | 84 | 93.6 |
| 5 | 2.5 | 25 | 29.2 | 45 | 65.8 | 65 | 84 | 85 | 94 |
| 6 | 3 | 26 | 31 | 46 | 67.7 | 66 | 84.6 | 86 | 94.4 |
| 7 | 3.5 | 27 | 32.8 | 47 | 69.5 | 67 | 85.2 | 87 | 94.8 |
| 8 | 4 | 28 | 34.7 | 48 | 71.3 | 68 | 85.8 | 88 | 95.2 |
| 9 | 4.5 | 29 | 36.5 | 49 | 73.2 | 69 | 86.4 | 89 | 95.6 |
| 10 | 5 | 30 | 38.3 | 50 | 75 | 70 | 87 | 90 | 96 |
| 11 | 6.5 | 31 | 40.2 | 51 | 75.6 | 71 | 87.6 | 91 | 96.4 |
| 12 | 8 | 32 | 42 | 52 | 76.2 | 72 | 88.2 | 92 | 96.8 |
| 13 | 9.5 | 33 | 43.8 | 53 | 76.8 | 73 | 88.8 | 93 | 97.2 |
| 14 | 11 | 34 | 45.7 | 54 | 77.4 | 74 | 89.4 | 94 | 97.6 |
| 15 | 12.5 | 35 | 47.5 | 55 | 78 | 75 | 90 | 95 | 98 |
| 16 | 14 | 36 | 49.3 | 56 | 78.6 | 76 | 90.6 | 96 | 98.4 |
| 17 | 15.5 | 37 | 51.2 | 57 | 79.2 | 77 | 91.2 | 97 | 98.8 |
| 18 | 17 | 38 | 53 | 58 | 79.8 | 78 | 91.8 | 98 | 99.2 |
| 19 | 18.5 | 39 | 54.8 | 59 | 80.4 | 79 | 91.6 | 99 | 99.6 |
| 20 | 20 | 40 | 56.7 | 60 | 81 | 80 | 92 | 100 | 100 |

EVALUATING AND PRESENTING SOFTWARE TESTING PROJECT STATUS INDICATORS

RELATED APPLICATIONS

This application is a divisional of U.S. patent application Ser. No. 14/662,518 filed on Mar. 19, 2015, the entire content of which is incorporated by reference herein.

TECHNICAL FIELD

The present disclosure is generally related to computer systems, and is more specifically related to software testing methods and systems.

BACKGROUND

"Software testing" herein shall refer to activity aimed at evaluating certain attributes and/or capabilities of a software program or a software service in order to determine whether the software program or the software service meets certain requirements with respect to its functions, reliability, availability, accuracy, usability, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for evaluating and presenting software testing project status indicators.

A software project may comprise multiple software modules, which may need to be tested separately and/or collectively in various combinations by executing a plurality of testing scenarios. Such testing scenarios may be performed at various levels, including unit testing, integration testing, component interface testing, and system testing. In various illustrative examples, the testing scenarios may include functional, performance, usability, security, localization, reliability, availability, accuracy, and other types of tests.

From the project management perspective, it may be desirable to be able to evaluate the state of a software testing project, its degree of completion, estimated completion date, and certain other project parameters, which are herein collectively referred to as "software testing project status indicators."

"Executed" test herein refers to a test that has been performed, irrespective of the result of such performance (passed or failed).

"Completed" test herein refers to a passed test.

"Test execution (completion) rate" herein shall refer to the ratio of the number of tests that have been executed (completed) or that are planned to be executed (completed) within a certain period of time to the number of units of time comprised by that time period.

Examples of test execution (completion) rates include: the average test execution (completion) rate over a certain period of time, the required test execution (completion) rate which is needed to achieve a certain project milestone, etc.

"Test execution (completion) ratio" herein refers to the ratio of the number of tests that have been executed as of a certain moment in time or are planned to be executed as of a certain moment in time to the total number of tests to be executed.

Examples of test execution (completion) ratios include: the actual test execution (completion) ratio or a planned test execution (completion) ratio.

In accordance with one or more aspects of the present disclosure, a computer system may determine and present via a graphical user interface various software testing project status indicators, including, e.g., the required test execution rate based on a target completion date, the variance of the actual test execution status with respect to the schedule, and/or an estimated total number of defects to be detected, as described in more details herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
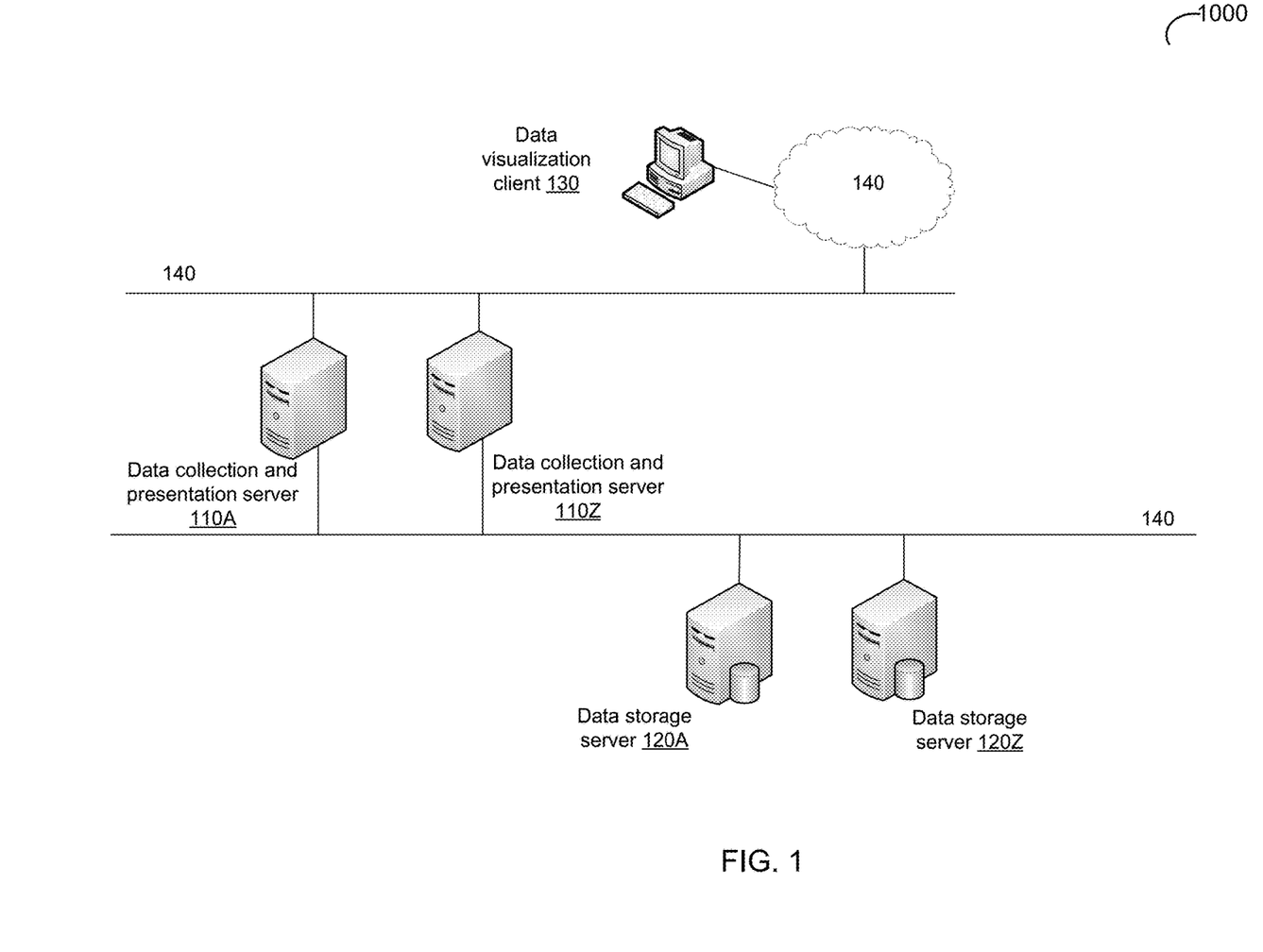
FIG. 1 schematically illustrates a high-level network diagram of an example distributed computer system that may implement the methods for evaluating and presenting software testing project status indicators, in accordance with one or more aspects of the present disclosure.

FIG. 1 schematically illustrates a high-level network diagram of an example distributed computer system 1000, which may implement the methods for evaluating and presenting software testing project status indicators, in accordance with one or more aspects of the present disclosure. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems described herein for evaluating and presenting software testing project status indicators.

Example distributed computer system 1000 may comprise one or more data collection and presentation servers 110A-110Z, which may be configured for implementing the methods for evaluating and presenting software testing project status indicators in accordance with one or more aspects of the present disclosure. In certain implementations, distributed computer system 1000 may further comprise one or more data storage servers 120A-120Z, which may be configured to store various data related to one or more software testing projects. Data storage servers 120A-120Z may be provided by file or block-level storage, relational databases, and/or data storage devices or systems of various other types.

Example distributed computer system 1000 may further comprise one or more data visualization clients 130, which may be configured to receive software testing project status indicators from data collection and presentation servers 110A-110Z in order to present the software testing project status indicators via a graphical user interface, as described in more details herein below.

Data collection and presentation servers 110, data visualization clients 130, and other components of example distributed computer system 1000 may be interconnected by one or more networks 140, which may comprise one or more local area networks and/or one or more wide area networks. Firewalls, load balancers, network switches and various other networking components may be omitted from FIG. 1 for clarity.

In certain implementations, one or more data collection and presentation servers 110 and/or other components of example distributed computer system 1000 may be communicatively coupled (e.g., via one or more networks) to one or more software testing hosts (not shown in FIG. 1) in order to automatically collect raw data for determining the software testing project status indicators in accordance with one or more aspects of the present disclosure. Alternatively, one or more data collection and presentation servers 110 and/or other components of example distributed computer system 1000 may receive at least part of the raw data via a graphical user interface and/or via communication interfaces from other components (not shown in FIG. 1) of a software testing system (not shown in FIG. 1). The raw data may comprise the numbers of executed, passed, and/or failed test cases, the number of defects detected, and other information that may be consumed by data collection and presentation servers 110 in order to determine various software testing project status indicators in accordance with one or more aspects of the present disclosure.

The above described architecture of distributed computer system 1000 serves as an illustrative example only and does not in any way limit the scope of the present disclosure. Various other system architectures may be compatible with the methods and systems for determining software testing project status indicators in accordance with one or more aspects of the present disclosure.

In accordance with one or more aspects of the present disclosure, a computer system implementing the methods described herein (e.g., one or more data collection and presentation servers 110) may receive (e.g., via an application programming interface (API) or via a graphical user interface raw data reflecting certain project parameters, such as the planned project completion date and the total number of test instances to be executed. The computer system may then process the received raw data to determine various software testing project status indicators, as described in more details herein below. The computer system may then cause the project status indicators to be presented via a user interface (e.g., displayed by one or more data visualization clients 130), as described in more details herein below with references to FIGS. 2A-2B.

In an illustrative example, the computer system may determine the test execution rate required for meeting a certain project completion date. The required test execution rate may be determined as the ratio of the number of test instances to be executed and the number of units of time (e.g., calendar days) remaining until the project completion date.

In another illustrative example, the computer system may determine one or more average test execution rates over certain time periods (e.g., a day, a week, a month, etc.), based on raw data comprising the numbers of test instances that were executed within certain time periods. The average test execution rate may be determined as the ratio of the number of executed tests within a certain period time and the number of units of time (e.g., calendar days) comprised by that period of time.

In yet another illustrative example, the computer system may determine the current test pass ratio being equal to the ratio of the number of passed test instances to the total number of executed test instances.

In yet another illustrative example, the computer system may determine the test execution schedule variance, which is represented by the number of units of time (e.g., calendar days) between the date corresponding to the actual test execution ratio (e.g., reflected by a ratio of the number of actually executed tests to the total number of tests) and the date, for which the schedule variance is being determined. In certain implementations, the schedule variance may be determined using a project timeline, which maps a plurality of values of the expected test execution ratio (i.e., the ratio of the number of tests to be executed by a certain date to the total number of tests to be executed) to a plurality of calendar dates. In an illustrative example, the project timeline may be defined by a set of milestones, in which each milestone defines a date, by which a certain test execution ratio is planned to be achieved. The expected test execution ratio for other calendar periods (i.e., calendar dates between two milestone dates) may be interpolated using a pre-defined interpolation function (e.g., a linear interpolation).

Figure 3:
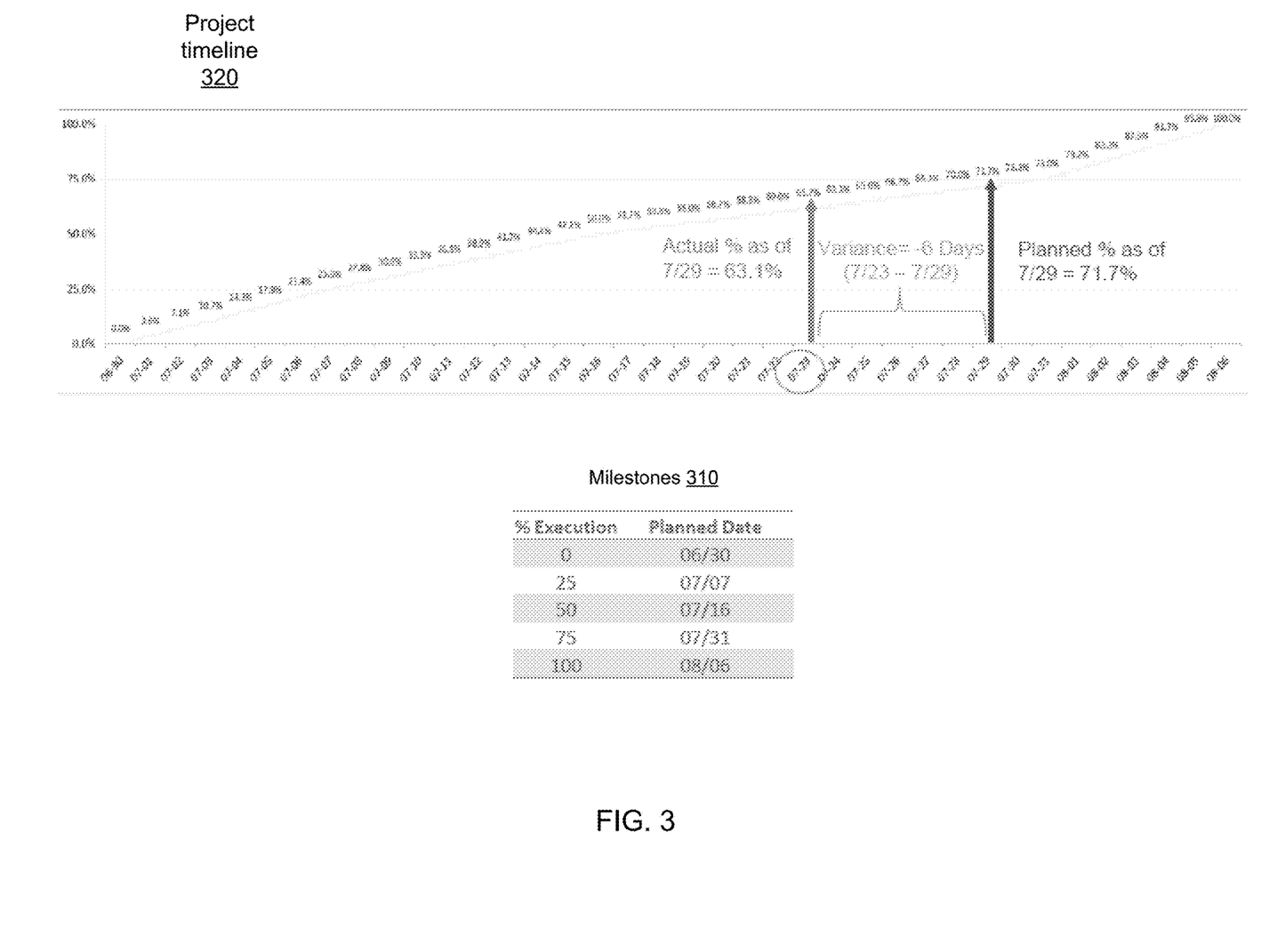
FIG. 3 schematically illustrates a project schedule mapping certain test execution milestones to planned completion dates, in accordance with one or more aspects of the present disclosure.

FIG. 3 schematically illustrates a project schedule mapping certain test execution milestones to planned completion dates, in accordance with one or more aspects of the present disclosure. As shown in FIG. 3, a set 310 of milestones comprises a plurality of mappings of certain project milestones (25%, 50%, 75%, and 100% of tests being executed) to planned completion dates. The computer system may use milestone set 310 for producing a project timeline 320, by interpolating the values of the expected test execution ratios for calendar dates that do not coincide with the milestone dates. In the illustrative example of FIG. 3, to determine a value of the test execution ratio for a calendar date that does not coincide with one of the milestone dates, the computer system may perform a linear interpolation based on the defined values of test execution ratios for two milestone dates are closest to the calendar date, for which the test execution ratio needs to be determined.

A computer system implementing the methods described herein may use the project timeline for determining the test execution schedule variance. The test execution schedule variance may be determined as the number of units of time (e.g., calendar days) between the date corresponding to the actual test execution ratio and the date for which the schedule variance is being determined. In an illustrative example of FIG. 3, on July 29, the actual test execution ratio was equal to 63.1%, and hence the test execution schedule variance as of July 29 is determined as the number of calendar days between July 29 and July 23, which is the date corresponding to the actual test execution ratio of 63.1%. The computer system may cause the test execution schedule variance to be presented via a user interface (e.g., displayed by one or more data visualization clients 130), as described in more details herein below with reference to FIG. 2B.

While an "executed" test includes either a passed or a failed test, a "completed" test only refers to a passed test. In certain implementations, the computer system may determine the test completion schedule variance, which is represented by the number of units of time (e.g., calendar days) between the date corresponding to the actual test completion ratio and the date for which the schedule variance is being determined. In certain implementations, the schedule variance may be determined using a project timeline, which shows the expected test completion ratio (i.e., the ratio of the number of tests to be completed by a certain date to the total number of tests to be completed) for a plurality of calendar dates. In an illustrative example, the project timeline may be defined by a set of milestones, in which each milestone defines a date by which a certain test completion ratio is planned to be achieved. The expected test completion ratio for other calendar periods (i.e., calendar dates between two milestone dates) may be interpolated using a pre-defined interpolation function (e.g., a linear interpolation).

In certain implementations, the computer system may cause a plurality of software testing project status indicators to be presented via a user interface (e.g., displayed by one or more data visualization clients 130) in a visual relation to each other, to a timeline, and/or to another project's status indicators. In various illustrative examples, the project status indicators may include one or more average test execution rates, the required test execution rate, the test execution schedule variance, the actual test completion ratio, and/or the test completion schedule variance. The visual relation may be provided by the relative placement of the values of the project status indicators, by displaying certain graphical elements that are visually linking the values of the project status indicators, and/or by using a certain color palette for displaying the values of the project status indicators.

Figure 2A:
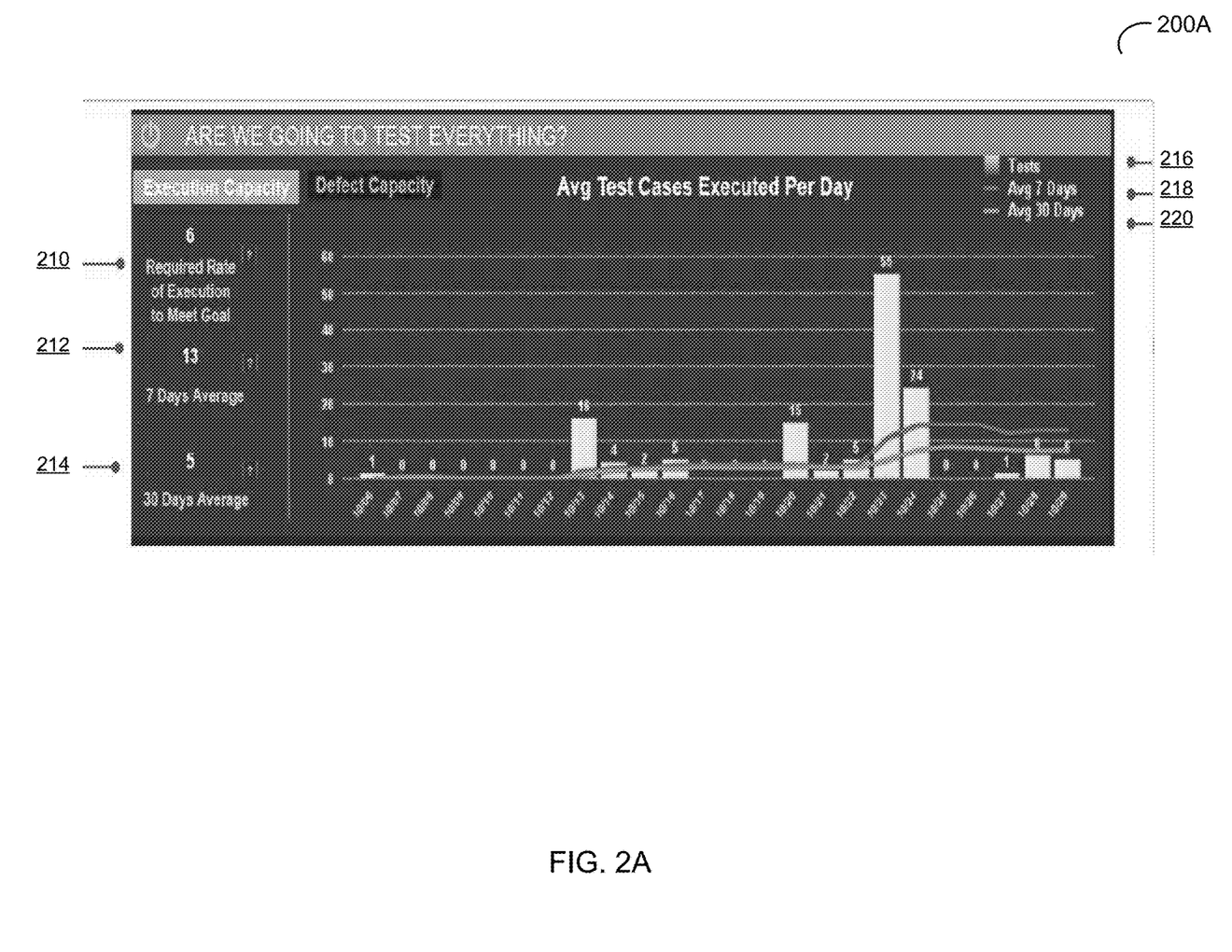
FIGS. 2A-2B schematically illustrate example data visualization graphical user interfaces that may be employed by a computer system implementing the methods described herein for evaluating and presenting software testing project status indicators, in accordance with one or more aspects of the present disclosure.
Figure 2B:
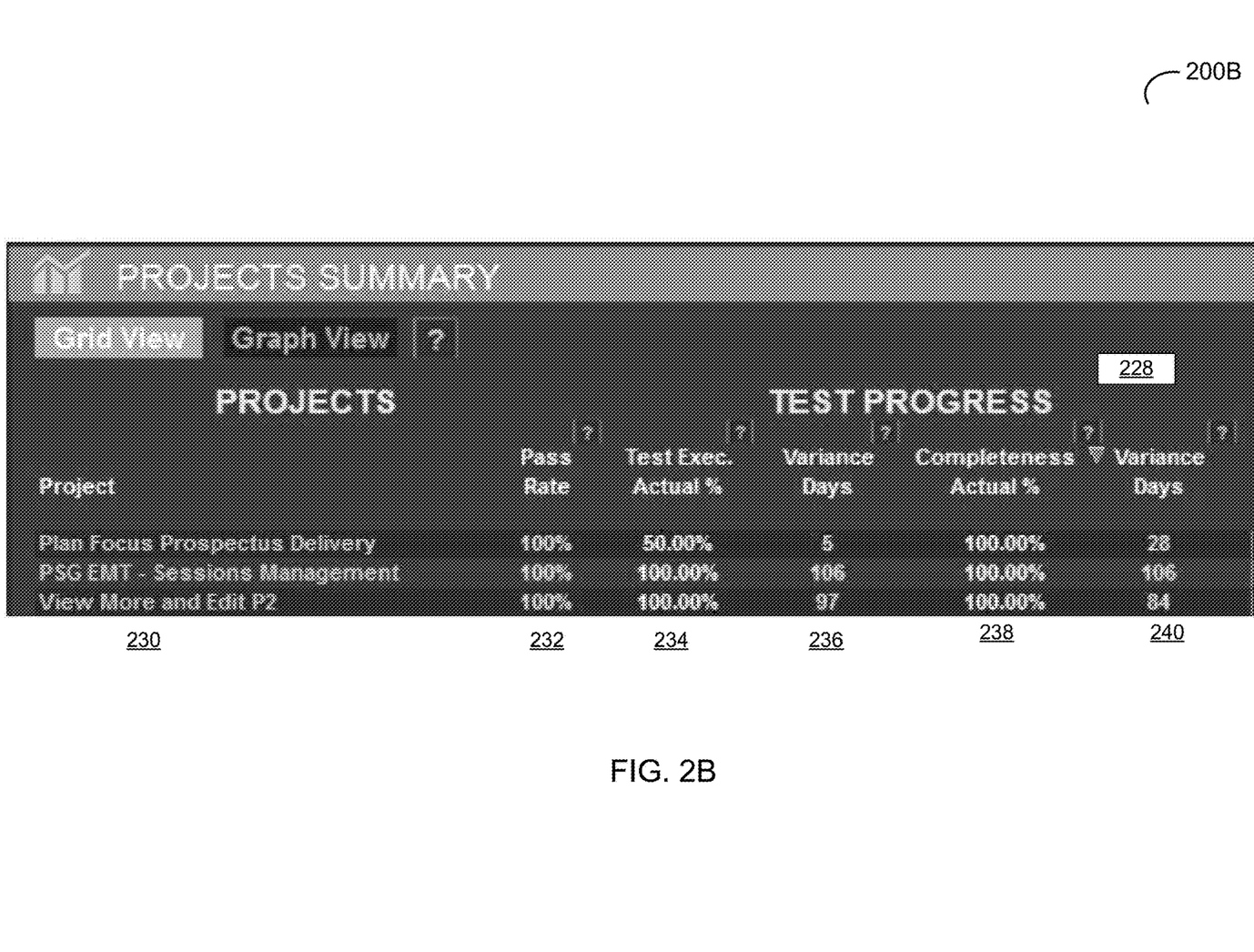

FIGS. 2A-2B schematically illustrate example data visualization graphical user interfaces that may be employed by a computer system implementing the methods described herein for evaluating and presenting software testing project status indicators. As schematically illustrated by FIG. 2A, example data presentation screen 200A comprises several numerical output fields representing the current values of certain project status indicators, including an output field 210 representing the required test execution rate determined based on a certain project completion date, an output field 212 representing the current value of the 7-day average test execution date, and an output field 214 representing the current value of the 30-day average test execution date. Example data presentation screen 200A further comprises several graphs depicting varying values of certain project status indicators over a certain time period, including a bar chart 216 depicting the numbers of tests that were executed by calendar day, a graph 218 depicting the 7-day average test execution date by calendar day, and a graph 220 depicting the 30-day average test execution date by calendar day.

Example data presentation screen 200B comprises a table 228, rows of which correspond to projects, and the columns define, respectively, the project title or other identifier (column 230), the current test pass ratio (column 232), the actual test execution ratio (column 234), the current test execution schedule variance (column 236), the actual test completion ratio (column 238), and the current test completion schedule variance (column 240).

In certain implementations, a computer system implementing the methods described herein may further determine an estimated total number of defects to be detected. Based on the estimated total number of defects and the actual test execution ratio, the computer system may further determine an estimated number of remaining defects to be detected as of a certain date. In an illustrative example, the estimated total number of defects may be determined using a defect prediction function, which maps a plurality of values of the test completion ratio to a plurality of values of the defect detection ratio.

Figure 4:
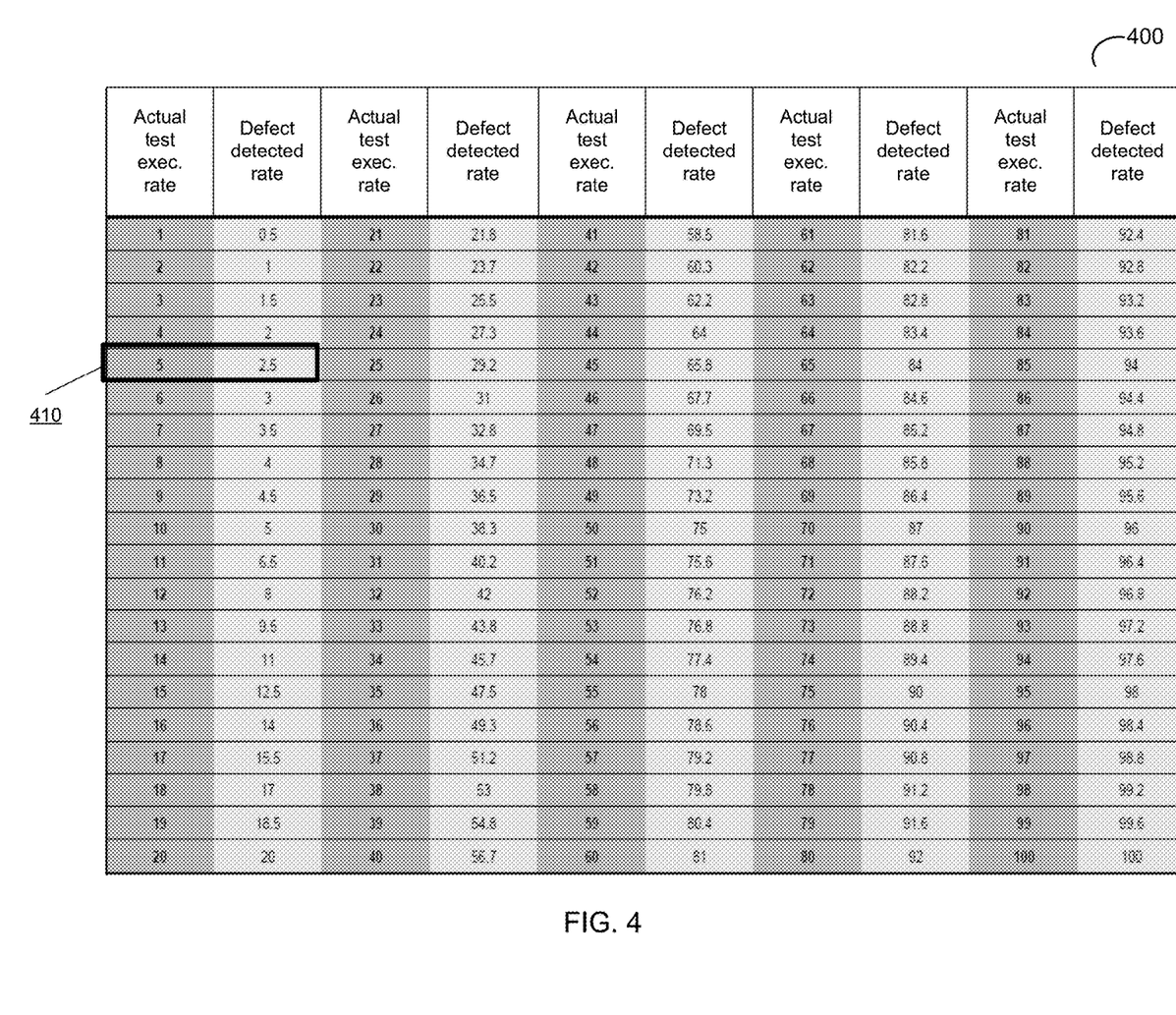
FIG. 4 schematically illustrates a table defining an example defect prediction function, in accordance with one or more aspects of the present disclosure.

In certain implementations, the defect prediction function may be defined by a table, as schematically illustrated by FIG. 4. Table 400 may comprise a plurality of entries 410, such that each entry 410 associates a test execution ratio (i.e., the ratio of the number of executed tests to the total number of tests to be executed) with a corresponding defect detection ratio. In certain implementations, the defect prediction table may be created based on an experimental data set comprising a plurality of data items relating to a plurality of previously performed software testing projects. Each data item of the experimental data set may correlate a value of the defect detection ratio to a value of the test execution ratio.

In an illustrative example, the computer system may use the following equation to determine an estimated total number of defects to be detected:

$$D=(2-C/100)*A,$$

wherein D is the estimated total number of defects to be detected,

C is the defect detection ratio, and

A is the actual number of detected defects.

The defect detection ratio C corresponding to the actual test completion ratio may be determined using the defect prediction table. In the illustrative example of FIG. 4, the defect detection ratio C corresponding to the test execution ratio of 12% is C (12%)=8. Hence, assuming the actual number of detected defects A=45, the estimated total number of defect to be detected can be determined as $D=(2-C/100)*A=(2-8/100)*45=86.4$.

In certain implementations, the computer system may cause the estimated total number of defects to be detected, the estimated number of remaining defects to be detected as of a certain date, and certain other project parameters to be presented via a user interface (e.g., displayed by one or more data visualization clients 130).

The above described data presentation screens serve as illustrative examples only and do not in any way limit the scope of the present disclosure. Various other data presentation screens may be compatible with the methods and systems described herein for evaluating and presenting software testing project status indicators.

Figure 5A:
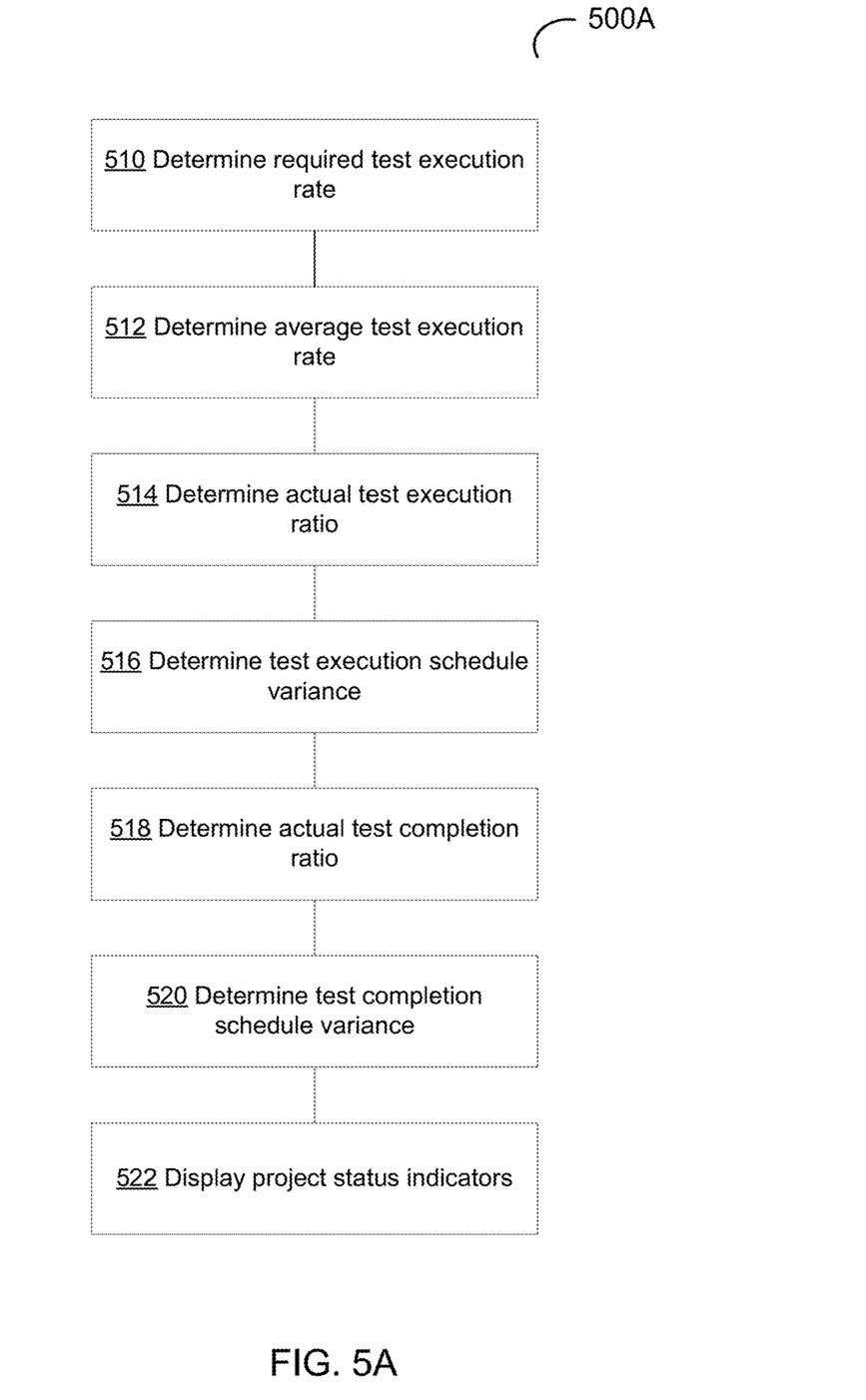
FIGS. 5A-5B depict a flow diagram of an example method for evaluating and presenting software testing project status indicators, in accordance with one or more aspects of the present disclosure.

FIG. 5A depicts a flow diagram of an illustrative example of method 500A for evaluating and presenting software testing project status indicators, in accordance with one or more aspects of the present disclosure. Method 500A and/or each of its individual functions, routines, subroutines, or operations may be performed by one or more computer systems comprising one or more general purpose and/or specialized processors. Two or more functions, routines, subroutines, or operations of method 500A may be performed in parallel or in an order that may differ from the order described above. In certain implementations, method 500A may be performed by a single processing thread. Alternatively, method 500A may be performed by two or more processing threads, each thread executing one or more individual functions, routines, subroutines, or operations of the method. In an illustrative example, the processing threads implementing method 500A may be synchronized (e.g., using semaphores, critical sections, and/or other thread synchronization mechanisms). Alternatively, the processing threads implementing method 500A may be executed asynchronously with respect to each other. In an illustrative example, method 500A may be performed by an example computer system 600 described herein below with references to FIG. 6.

Referring to FIG. 5A, at block 510, the computer system implementing the method may determine a required test execution rate based on a target completion date. In an illustrative example, the required test execution rate may be determined as the ratio of the number of test instances to be executed to the number of units of time (e.g., calendar days) remaining until the project completion date, as described in more details herein above.

At block 512, the computer system may determine an average test execution rate over a certain period of time (e.g., a day, a week, a month, etc.), based on raw data comprising the numbers of test instances that were executed within certain time periods. The average test execution rate may be determined as the ratio of the number of executed tests within a certain period time and the number of units of time (e.g., calendar days) comprised by that period of time, as described in more details herein above.

At block 514, the computer system may determine the actual test execution ratio as the ratio of the number of executed test instances to the total number of test instances to be executed, as described in more details herein above.

At block 516, the computer system may determine the test execution schedule variance as the number of units of time (e.g., calendar days) between the date corresponding to the actual test execution ratio and the date for which the schedule variance is being determined, as described in more details herein above.

At block 518, the computer system may determine the actual test completion ratio as the ratio of the number of completed test instances to the total number of test instances to be executed, as described in more details herein above.

At block 520, the computer system may determine the test completion schedule variance as the number of units of time (e.g., calendar days) between the date corresponding to the actual test completion ratio and the date for which the schedule variance is being determined, as described in more details herein above.

At block 522, the computer system may cause a plurality of software testing project status indicators to be presented via a user interface in a visual relation to each other, to a timeline, and/or to another project's status indicators. In various illustrative examples, the project status indicators may include one or more average test execution rates, the required test execution rate, the test execution schedule variance, the actual test completion ratio, and/or the test completion schedule variance. The visual relation between the displayed values may be provided by the relative placement of the values on the screen, by displaying certain graphical elements that are visually linking the values of average test execution rates and the value of the required test execution rate on the screen, and/or by using a certain color palette for displaying the values of average test execution rates and the value of the required test execution rate on the screen, as described in more details herein above.

Figure 5B:
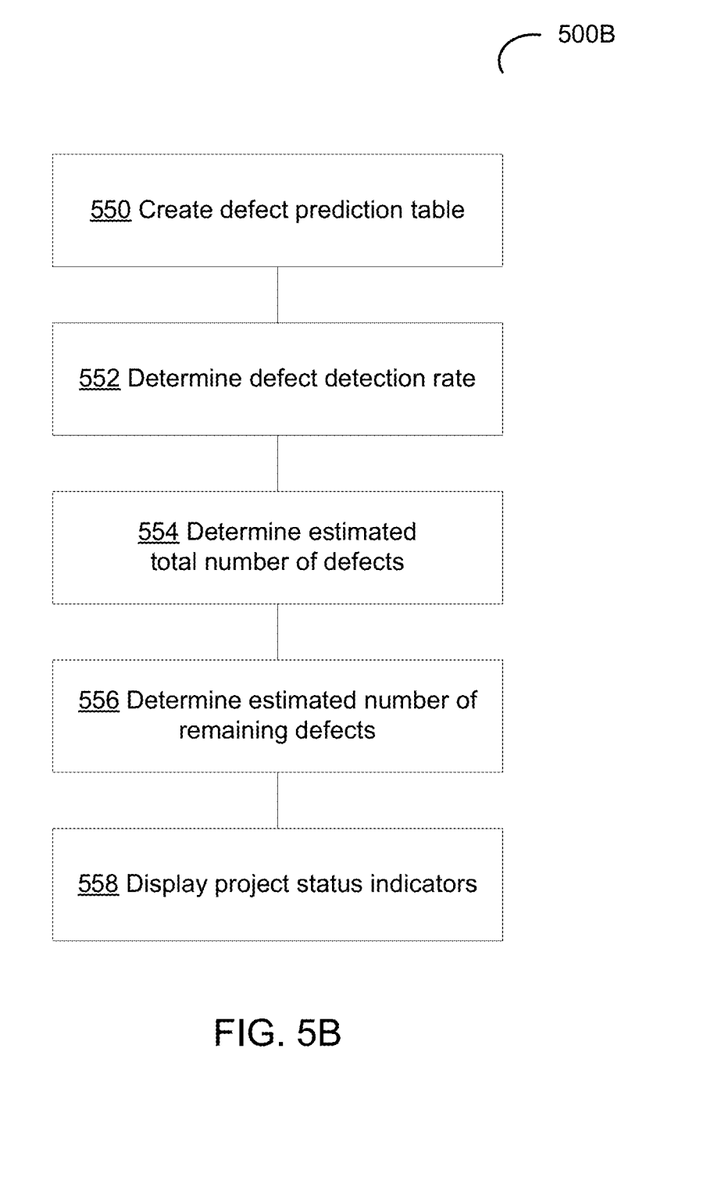

FIG. 5B depicts a flow diagram of an illustrative example of method 500B for evaluating and presenting software testing project status indicators, in accordance with one or more aspects of the present disclosure. Method 500B and/or each of its individual functions, routines, subroutines, or operations may be performed by one or more computer systems comprising one or more general purpose and/or specialized processors. Two or more functions, routines, subroutines, or operations of method 500B may be performed in parallel or in an order that may differ from the order described above. In certain implementations, method 500B may be performed by a single processing thread. Alternatively, method 500B may be performed by two or more processing threads, each thread executing one or more individual functions, routines, subroutines, or operations of the method. In an illustrative example, the processing threads implementing method 500B may be synchronized (e.g., using semaphores, critical sections, and/or other thread synchronization mechanisms). Alternatively, the processing threads implementing method 500B may be executed asynchronously with respect to each other. In an illustrative example, method 500B may be performed by an example computer system 600 described herein below with references to FIG. 6.

Referring to FIG. 5B, at block 550, the computer system implementing the method may create, based on one or more experimental data items, a defect prediction table comprising a plurality of entries, each entry associating a certain defect detection ratio with the test execution ratio, as described in more details herein above.

At block 552, the computer system may determine, using the defect prediction table, a value of the defect detection ratio corresponding to a given test execution ratio, as described in more details herein above.

At block 554, the computer system may determine an estimated total number of defects to be detected based on the defect detection ratio and a given actual number of detected defects, as described in more details herein above.

At block 556, the computer system may determine an estimated number of remaining defects to be detected as the difference between the estimated total number of defects and the actual number of detected defects, as described in more details herein above.

At block 558, the computer system may cause a plurality of software testing project status indicators to be presented via a user interface in a visual relation to each other, to a timeline, and/or to another project's status indicators. In various illustrative examples, the project status indicators may include the estimated total number of defects to be detected and/or the number of the remaining defects. The visual relation between the displayed values may be provided by the relative placement of the values on the screen, by displaying certain graphical elements that are visually linking the values of average test execution rates and the value of the required test execution rate on the screen, and/or by using a certain color palette for displaying the values of average test execution rates and the value of the required test execution rate on the screen, as described in more details herein above.

Figure 6:
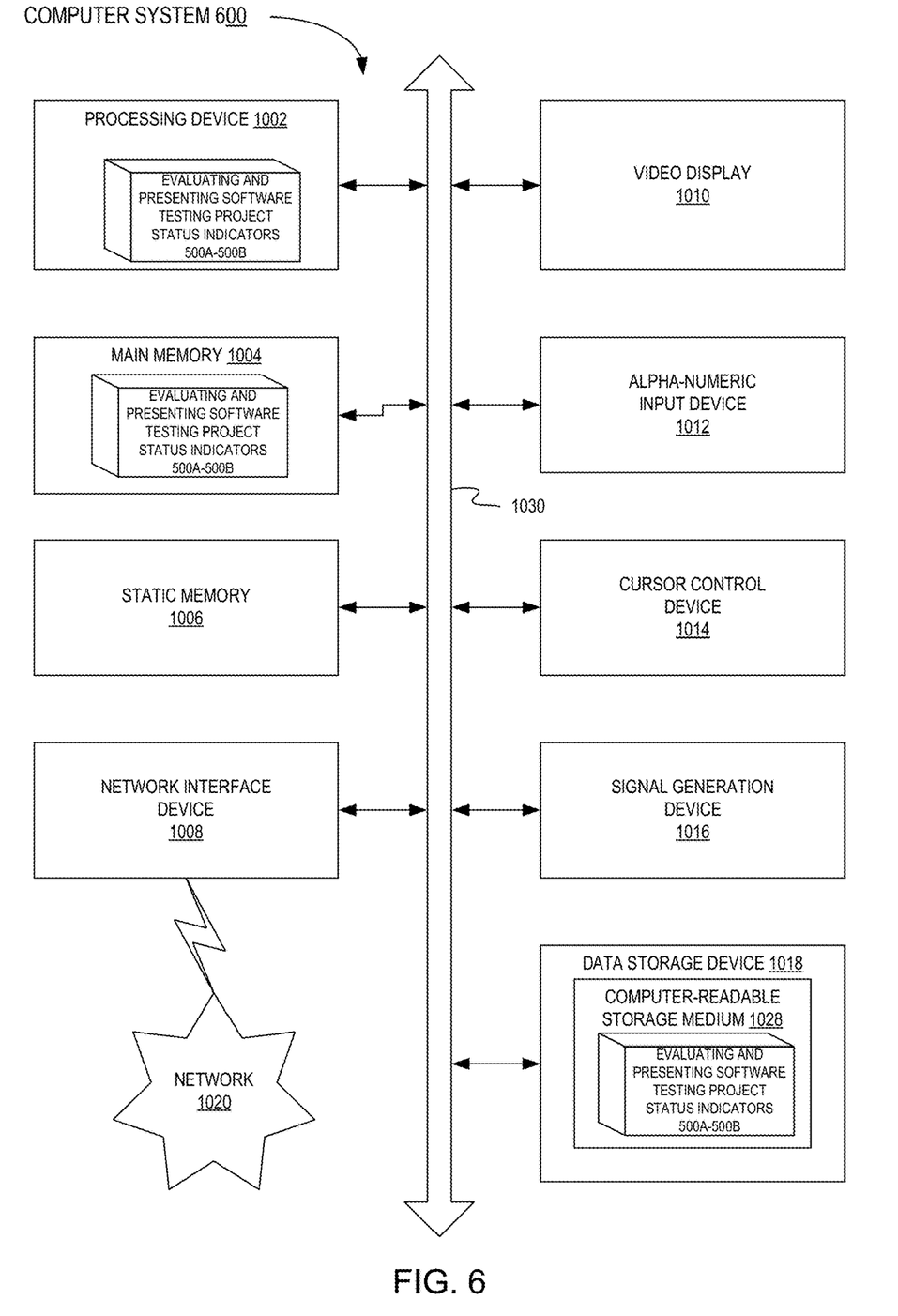
FIG. 6 depicts a block diagram of an illustrative computing device operating in accordance with one or more aspects of the present disclosure.

FIG. 6 illustrates a diagrammatic representation of an example computer system 600, within which a set of instructions for causing the computing device to perform the methods described herein may be executed. Computer system 600 may be connected to other computing devices in a LAN, an intranet, an extranet, and/or the Internet. Computer system 600 may operate in the capacity of a server machine in client-server network environment. Computer system 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, computer system 600 may implement the above described methods 500A-500B for evaluating and presenting software testing project status indicators.

Computer system 600 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute methods 500A-500B for evaluating and presenting software testing project status indicators, in accordance with one or more aspects of the present disclosure.

Computer system 600 may further include a network interface device 1008, which may communicate with a network 1020. Computer system 600 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028, on which may be stored one or more sets of instructions (e.g., instructions of methods 500A-500B for evaluating and presenting software testing project status indicators, in accordance with one or more aspects of the present disclosure) implementing any one or more of the methods or functions described herein. Instructions implementing methods 500A-500B may also reside, completely or at least partially, within main memory 1004 and/or within processing device 1002 during execution thereof by computer system 600, main memory 1004 and processing device 1002 also constituting computer-readable media. The instructions may further be transmitted or received over network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct a more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
  determining, by a computer system, based on a defect prediction function, an actual defect detection ratio based on a ratio of a number of completed tests to a total number of tests to be executed;
  determining an estimated total number of defects to be detected as a linear function of an actual number of detected defects, wherein a slope of the linear function is equal to a constant value reduced by the actual defect detection ratio;
  determining an estimated number of remaining defects to be detected based on the estimated total number of defects and the actual number of detected defects; and
  causing a plurality of project status indicators including the estimated number of remaining defects to be detected to be presented by a graphical user interface with visual references to a project timeline, wherein the visual references include graphical elements that are visually linking values of the project status indicators.

2. The method of claim 1, wherein the defect prediction function maps a plurality of test completion ratio values to a plurality of defect detection ratio values.

3. The method of claim 1, wherein the defect prediction function is implemented by a defect prediction table comprising a plurality of entries, wherein each entry associates a certain defect detection ratio with a corresponding test execution ratio.

4. The method of claim 3, further comprising:
creating the defect prediction table based on one or more experimental data items, each data item correlating a test execution ratio to a corresponding defect detection ratio.

5. The method of claim 1, wherein the estimated number of remaining defects is proportional to the estimated total number of defects.

6. The method of claim 1, wherein the estimated number of remaining defects is reverse proportional to the actual number of detected defects.

7. A system, comprising:
a memory; and
a processor, coupled to the memory, wherein the processor is configured to:
determine, using a defect prediction function, an actual defect detection ratio based on a ratio of a number of completed tests to a total number of tests to be executed;
determine an estimated total number of defects to be detected as a linear function of an actual number of detected defects, wherein a slope of the linear function is equal to a constant value reduced by the actual defect detection ratio;
determine an estimated number of remaining defects to be detected based on the estimated total number of defects and the actual number of detected defects; and
cause a plurality of project status indicators including the estimated number of remaining defects to be detected to be presented by a graphical user interface with visual references to a project timeline, wherein the visual references include graphical elements that are visually linking values of the project status indicators.

8. The system of claim 7, wherein the defect prediction function maps a plurality of test completion ratio values to a plurality of defect detection ratio values.

9. The system of claim 7, wherein the defect prediction function is implemented by a defect prediction table comprising a plurality of entries, wherein each entry associates a certain defect detection ratio with a corresponding test execution ratio.

10. The system of claim 9, wherein the processor is further configured to:
create the defect prediction table based on one or more experimental data items, each data item correlating a test execution ratio to a corresponding defect detection ratio.

11. The system of claim 7, wherein the estimated number of remaining defects is proportional to the estimated total number of defects.

12. The system of claim 7, wherein the estimated number of remaining defects is reverse proportional to the actual number of detected defects.

13. A computer-readable non-transitory storage medium comprising executable instructions that, when executed by a computer system, cause the computer system to:
determine, based on a defect prediction function, an actual defect detection ratio based on a ratio of a number of completed tests to a total number of tests to be executed;
determine an estimated total number of defects to be detected as a linear function of an actual number of detected defects, wherein a slope of the linear function is equal to a constant value reduced by the actual defect detection ratio;
determine an estimated number of remaining defects to be detected based on the estimated total number of defects and the actual number of detected defects; and
cause a plurality of project status indicators including the estimated number of remaining defects to be detected to be presented by a graphical user interface with visual references to a project timeline, wherein the visual references include graphical elements that are visually linking values of the project status indicators.

14. The computer-readable non-transitory storage medium of claim 13, wherein the defect prediction function maps a plurality of test completion ratio values to a plurality of defect detection ratio values.

15. The computer-readable non-transitory storage medium of claim 13, wherein the defect prediction function is implemented by a defect prediction table comprising a plurality of entries, wherein each entry associates a certain defect detection ratio with a corresponding test execution ratio.

16. The computer-readable non-transitory storage medium of claim 15, further comprising executable instructions that, when executed by the computer system, cause the computer system to:
create the defect prediction table based on one or more experimental data items, each data item correlating a test execution ratio to a corresponding defect detection ratio.

17. The computer-readable non-transitory storage medium of claim 13, wherein the estimated number of remaining defects is proportional to the estimated total number of defects.

18. The computer-readable non-transitory storage medium of claim 13, wherein the estimated number of remaining defects is reverse proportional to the actual number of detected defects.

* * * * *